A. D. COBB.
MEAT-CHEST.
No. 175,930. Patented April 11, 1876.
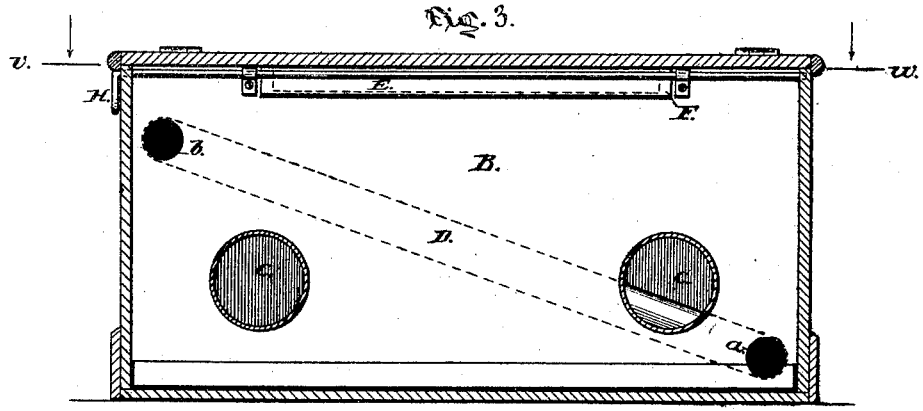
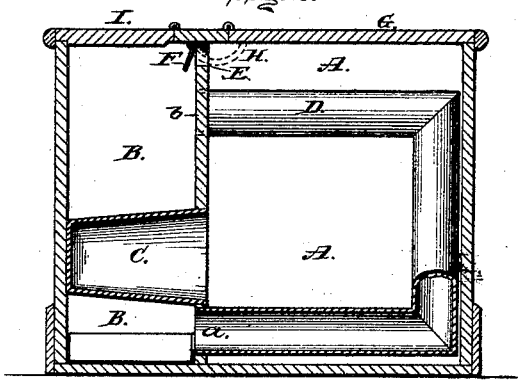
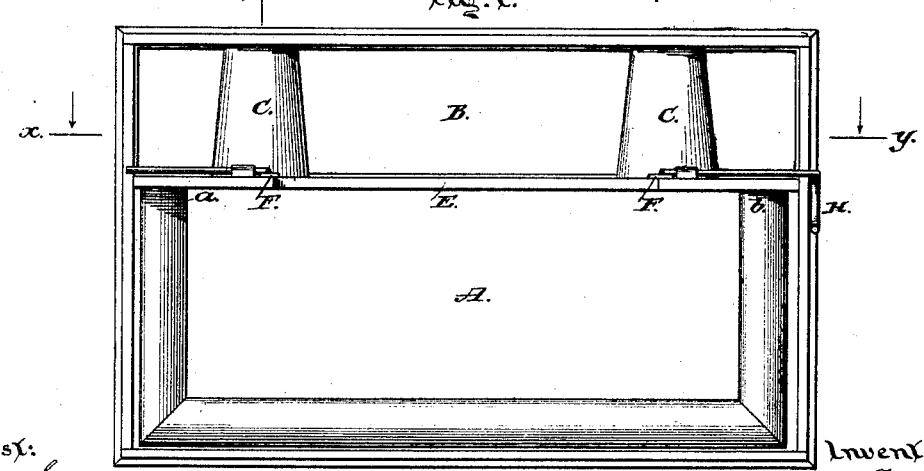
Attest:
Wm. M. Sargent.
J. B. Curtis.
Inventor:
Aaron D. Cobb
Per Smith & Bird
att'ys

UNITED STATES PATENT OFFICE.

AARON D. COBB, OF PORTLAND, MAINE.

IMPROVEMENT IN MEAT-CHESTS.

Specification forming part of Letters Patent No. 175,930, dated April 11, 1876; application filed May 28, 1874.

*To all whom it may concern:*

Be it known that I, AARON D. COBB, of Portland, in the county of Cumberland and State of Maine, have invented certain new and useful Improvements in Meat-Chests; and I do hereby declare that the following is a full, clear, and exact description thereof, that will enable others skilled in the art to which it appertains to make and use the same, reference being had to the accompanying drawings, forming a part of this specification, in which—

Figure 1 represents a top view of my meat-chest with the covers removed. Fig. 2 represents a sectional end view of my chest. Fig. 3 represents a sectional side view of the same.

The object of my invention is to preserve liquids and other perishable substances from being injured by heat, and is especially intended to preserve meat or fish in liquid pickle.

The common mode of keeping the pickle cool is by immersing ice in the pickle; but the melting of the ice weakens the pickle, and the meat is soon damaged.

My invention consists of a meat-chest having one or more passages for cold air through the pickle, and also having a pickle or receiving chamber with hollow cylinders projecting from it through the ice-chamber. It also has an automatic arrangement, by which, when the pickle-chamber is closed, the air from the ice-chamber circulates freely and unconfined over the surface of, and through the passages in, the pickle; but when the pickle-chamber is open the raising of the cover closes this connection between the two chambers, so that no warm air is thrown in upon the ice, while the confined current of air constantly passes from the ice-chamber through the pickle-chamber.

My meat-chest is adapted to preserving other substances without pickle.

The following is a full and particular description of my invention:

A represents the receiving or pickle chamber. B represents the ice-chamber, each having separate covers. C C represent cylinders or other conveniently-shaped hollow projections of any suitable material extending from the pickle-chamber through the ice-chamber, and opening only into the pickle-chamber. These projections may consist of one or more, and may be of any convenient shape. The office of these cylinders is to expose, by means of a better conducting medium, a larger cooling-surface for the pickle and for the ice of the ice-chamber. D represents a hollow tube of any suitable material, (I prefer cement, as not liable to corrode,) extending from the ice-chamber near its bottom and connecting therewith through the pickle-chamber, and again connecting with the ice-chamber near its top, so that the cold air of the ice-chamber as it settles will pass into the tube at *a*, thence, as it is warmed by the higher temperature of the pickle-chamber, will rise through the tube and finally flow back into the ice-chamber at *b*, where, being cooled by the ice, it settles and again passes into the tube at *a*, thus maintaining a constant current of confined cold air passing through the pickle-chamber so long as the temperature of the pickle-chamber is higher than that of the ice chamber. The tube D may run in any direction found convenient, and there may be one or more of them; but the point of exit from the ice-chamber at *a* should be lower than the point of entrance at *b*, in order to cause the current. The tube may also be of any convenient form, but I prefer to have it round, as the air then flows more freely through it.

E represents an opening or passage of any convenient size and form, made by cutting out the partition between the chambers A and B near the top, so that the cold air from B can flow freely into A over the top of the pickle or other substances. F represents a hinged valve, operated by the cover G in connection with the lever H. G represents the cover of the pickle-chamber A; and I the cover of the ice-box B. H represents a lever firmly fixed, preferably on the outside of the tank, to the valve F at one end, the other end resting against the under side of the cover G, so that when the cover G is closed the weight of the cover pressing upon the end of the lever H forces that end downward, thus rotating or turning the valve upward, so as to leave the passage E open and allow the cold air to pass from the chamber B into the chamber A.

When the cover G is raised its weight is removed from the end of the lever H, and the valve F, falling by its own weight, closes the passage E, thus cutting off the connection between the chambers A and B; or another method would be to attach the end of the lever H to the cover G by a spring or other suitable device, so that the raising of the cover shall close the opening E by a positive movement. This opening E may also be closed by a slide moving up, down, or longitudinally, and operated by the cover.

What I claim, and desire to secure by Letters Patent, is—

1. For preserving meats in pickle, a meat-chest, having the chambers A and B with the covers G and I, and the pipe D, and cylinders C, all arranged and combined as herein set forth.

2. A meat-chest, consisting of two chambers, A and B, having the covers I and G, the valve F and lever H, and the pipe D, and cylinders C, combined and arranged as set forth.

In testimony that I claim the foregoing I have hereunto set my hand this 19th day of May, 1874.

AARON D. COBB.

Witnesses:
MANASSEH SMITH,
GEO. E. BIRD.